US009141420B2

(12) United States Patent
Chang et al.

(10) Patent No.: US 9,141,420 B2
(45) Date of Patent: Sep. 22, 2015

(54) OVERLOAD CONTROL IN A CLOUD COMPUTING ENVIRONMENT

(75) Inventors: Yuh-Jye Chang, Bridgewater, NJ (US); Adiseshu Hari, Holmdel, NJ (US); Pramod Koppol, Manalapan, NJ (US); Antony Martin, Pays de la Loire (FR); Thanos Stathopoulos, Jersey City, NJ (US); Dimitrios Stiliadis, San Jose, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 660 days.

(21) Appl. No.: 12/939,627

(22) Filed: Nov. 4, 2010

(65) Prior Publication Data

US 2012/0117563 A1    May 10, 2012

(51) Int. Cl.
*G06F 9/455* (2006.01)

(52) U.S. Cl.
CPC .... *G06F 9/45558* (2013.01); *G06F 2009/4557* (2013.01)

(58) Field of Classification Search
None
See application file for complete search history.

(56) References Cited

U.S. PATENT DOCUMENTS

| 7,539,899 B1 * | 5/2009 | Wang | 714/15 |
| 2008/0059639 A1 * | 3/2008 | Zhang | 709/227 |
| 2012/0016977 A1 * | 1/2012 | Robertson et al. | 709/224 |

OTHER PUBLICATIONS

"Performance Implications of Hosting Enterprise Telephony Applications on Virtualized Multi-Core Platforms" David Patanik, College of Computing, Georigia Institute of Technology.

"VL2: A Scaleable and Flexible Data Center Network" Albert Greenberg, et al., Microsoft Research, pp. 51-62.
"Memory Resource Management in VMware ESX Server" Carl A. Waldspurger, VMware, Inc., pp. 1-14.
"Virtual Putty: Reshaping the Physical Footprint of Virtual Machines" Jason Sonnek, et al. Department of Computer Science and Engineering, University of Minnesota pp. 1-5.
"Internet Key Exchange (IKEv2) Protocol" C. Kaufman, Ed. Microsoft, pp. 1-99.
"Enhancing Dynamic Cloud-Based Services Using Network Virtualization" Fang Hao, et al. Bell-Labs, Alcatel-Lucent, pp. 37-44.
"Bridging the Gap Between Software and Hardware Techniques for I/O Virtualization" Jose Renato Santos, et al. Hewlett Packard Laboratories & University of Cambridge, pp. 29-42.
"Remus: High Availability Via Asynchronous Virtual Machine Replication" Brendan Cully, et al. Department of Computer Science The University of British Columbia, pp. 161-174.
"Portland: A Scalable Fault-Tolerant Layer 2 Data Center Network Fabric" Radhika Niranjan Mysore, et al. Department of Computer Science and Engineering University of California San Diego, pp. 39-50.

* cited by examiner

*Primary Examiner* — Mengyao Zhe
(74) *Attorney, Agent, or Firm* — Harness, Dickey & Pierce, P.L.C.

(57) ABSTRACT

Provided is a method and devices for overload control in a cloud computing environment. The method includes receiving a first message from a network element associated with the cloud computing environment. The first message includes information associated with a target virtual machine and a list of sessions from the one or more sessions to move from the serving virtual machine to the target virtual machine. Associating one or more client addresses with an address associated with the target virtual machine based on the list of sessions. And, treating the target virtual machine as the serving virtual machine if processing sessions associated with the list of sessions.

9 Claims, 11 Drawing Sheets

OVERLOAD CONTROL IN A CLOUD COMPUTING ENVIRONMENT

FIELD OF THE INVENTION

Embodiments relate to cloud computing environments using virtual machines.

BACKGROUND OF THE INVENTION

In a cloud computing environment, typically using the smallest set of resources needed for satisfying the current load is desirable. When this set needs to be expanded to accommodate additional load offered, addressing the overload condition on specific virtual machines within this set of resources may be necessary. A big challenge in addressing this condition is to reduce the burden of an overloaded virtual machine by transferring load to another virtual machine without adversely impacting any ongoing sessions.

Virtualization of a computing infrastructure such as that used for offering telephone communications services involves offering such services over a cloud computing environment. Those skilled in the art know cloud computing as a model for enabling convenient, on-demand network access to a shared pool of configurable computing resources (e.g., networks, servers, storage, applications, and services) that can be rapidly provisioned and released with minimal management effort or service provider interaction.

Virtualization may include the use of physical machines, servers and virtual machines. A physical machine or a server is a physical entity. A virtual machine is a pure software entity. A single physical machine may host multiple virtual machines. The term "server" may refer to either a physical machine or a virtual machine, based on context.

Implementation of services within a cloud computing environment offers significant advantages in terms of quick loading of infrastructure cost to a cloud provider, rapid time to ramp up, seamless scaling, sharing of the infrastructure by multiple service providers, and global reach. Efficient implementations of cloud based services should scale to the limits of the cloud infrastructure and must be elastic in that the resources used by a service expand and contract according to the load offered. However, there have been some challenges regarding effectively providing overload control in a cloud computing environment.

SUMMARY OF THE INVENTION

Example embodiments provide solutions which facilitate overload mitigation through creation of a clone for an overloaded virtual machine and splitting the client sessions among the original and the cloned virtual machines. This split operation is transparent to the users or clients of the sessions, as both the original and the cloned virtual machines retain the same session addressing. A session dispatcher assists this split operation by redirecting certain sessions to the cloned virtual machine thereby providing a dynamic session migration capability for the service without the service having to explicitly support dynamic session migration.

One embodiment includes a method for overload mitigation of a virtual machine in a cloud computing environment, the virtual machine being a serving virtual machine for one or more sessions. The method includes receiving a first message from a network element associated with the cloud computing environment. The first message includes information associated with a target virtual machine and a list of sessions from the one or more sessions to move from the serving virtual machine to the target virtual machine. Associating one or more client addresses with an address associated with the target virtual machine based on the list of sessions. And, treating the target virtual machine as the serving virtual machine if the session dispatcher is processing sessions associated with the list of sessions.

Another embodiment includes a method for overload mitigation of a virtual machine in a cloud computing environment, the virtual machine being a serving virtual machine for one or more sessions. The method includes receiving a first message from the serving virtual machine. The first message includes a list of sessions to transfer to a target virtual machine, the target virtual machine being a clone of the serving virtual machine. Sending a second message to a session dispatcher. The second message including the list of sessions, an address associated with a control module of the target machine and an indicator instructing the session dispatcher to associate one or more client addresses with the address associated with the control module of the target machine based on the list of sessions.

Another embodiment includes a method for overload mitigation of a virtual machine in a cloud computing environment, the virtual machine being a serving virtual machine for one or more sessions. The method includes assigning an address to a target virtual machine. The address being the address of a serving virtual machine associated with a different control module. The target virtual machine being a clone of the serving virtual machine. Forwarding at least one data packet associated with the one or more sessions to the target virtual machine if the data packet received by the control module includes the address of the serving virtual machine.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

Figure 1:
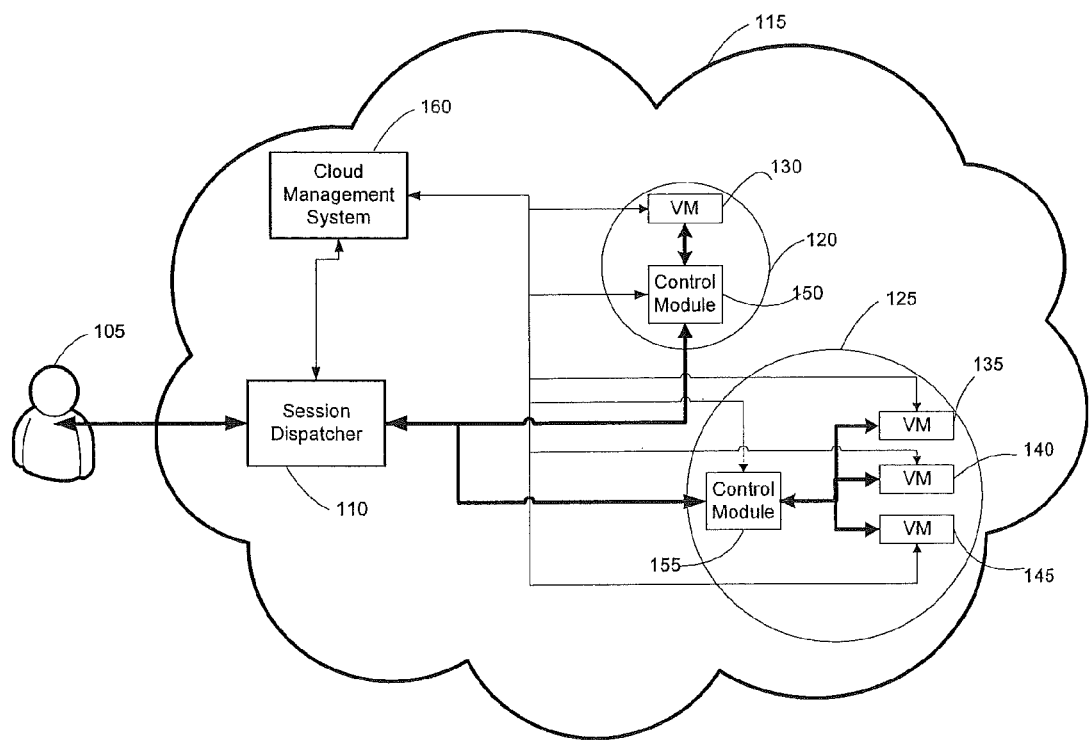
FIG. 1 illustrates a network according to example embodiments.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art.

An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

As used herein, the thin). "client" may be considered synonymous to, and may hereafter be occasionally referred to, as a user, mobile, mobile unit, mobile station, mobile user, user equipment, subscriber, remote station, access terminal, receiver, etc., and may describe a remote user of a wired or wireless resources in a communication network.

As used herein, the term "physical machine" may be considered synonymous to, and may hereafter be occasionally referred to, as a server, a network device, a networked computer, etc., and may describe a physical computing device of a wired or wireless communication network and configured to host a virtual machine.

FIG. 1 illustrates a network according to example embodiments. As shown in FIG. 1 a client 105 may be interconnected with a session dispatcher 110 (described in more detail with regard to FIG. 2 below). Although only one client is shown, it will be understood that example embodiments are not limited to one client 105. The session dispatcher 110 is included in a cloud network environment 115.

The cloud network environment 115 includes one or more physical machines 120, 125. A physical machine 120, 125 may include a control module 150, 155. A physical machine 120, 125 may include one or more virtual machines 130, 135, 140, 145. For example physical machine 120 includes control module 150 and a single virtual machine 130 and physical machine 125 includes control module 155 and three virtual machines 135, 140, 145. The control modules 150, 155 may be known to one skilled in the art as, for example, a Hypervisor or a Virtual Machine Manager (VMM). The control modules 150, 155 may be configured to host one or more virtual machines 130, 135, 140, 145.

As one skilled in the art knows, a virtual machine 130, 135, 140, 145 is a software implementation of a machine that executes software as if the virtual machine 130, 135, 140, 145 were a physical machine. Multiple virtual machines 130, 135, 140, 145 may be executed on a physical machine 120, 125. Similar to how an Operating System may allow multiple programs to run concurrently on a physical machine 120, 125, the control module 150, 155 or Hypervisor may allow multiple virtual machines 130, 135, 140, 145 to run concurrently on a physical machine 120, 125. For the sake of brevity, the general operation of a virtual machine 130, 135, 140, 145 will not be further described.

A cloud network environment 115 is known to those skilled in the art. In general, a cloud network environment 115 may be composed of multiple components (e.g., servers, databases, routers and multiplexers) communicating with each other and functioning to provide services to clients 105. Services may include, for example, voice, media, applications, computing resources and the like. Cloud network environments 115 provide flexible computing resources to many clients 105. As one skilled in the art knows, a cloud network environment 115 may be a public network, a private network and/or a hybrid (public/private) network.

In order to facilitate communication and operation of the cloud network environment 115, the cloud network environment 115 includes a cloud management system 160. The cloud management system 160 may be a standalone component including a processor, memory, a communications bus and some communication hardware configured to communicate with other components of the cloud network environments 115. Alternatively, the cloud management system 160 may be associated with some other component within the cloud network environment 115, for example a server. The operation of the cloud management system 160 will be described in more detail below with regard to FIGS. 3A and 3B.

Figure 2:
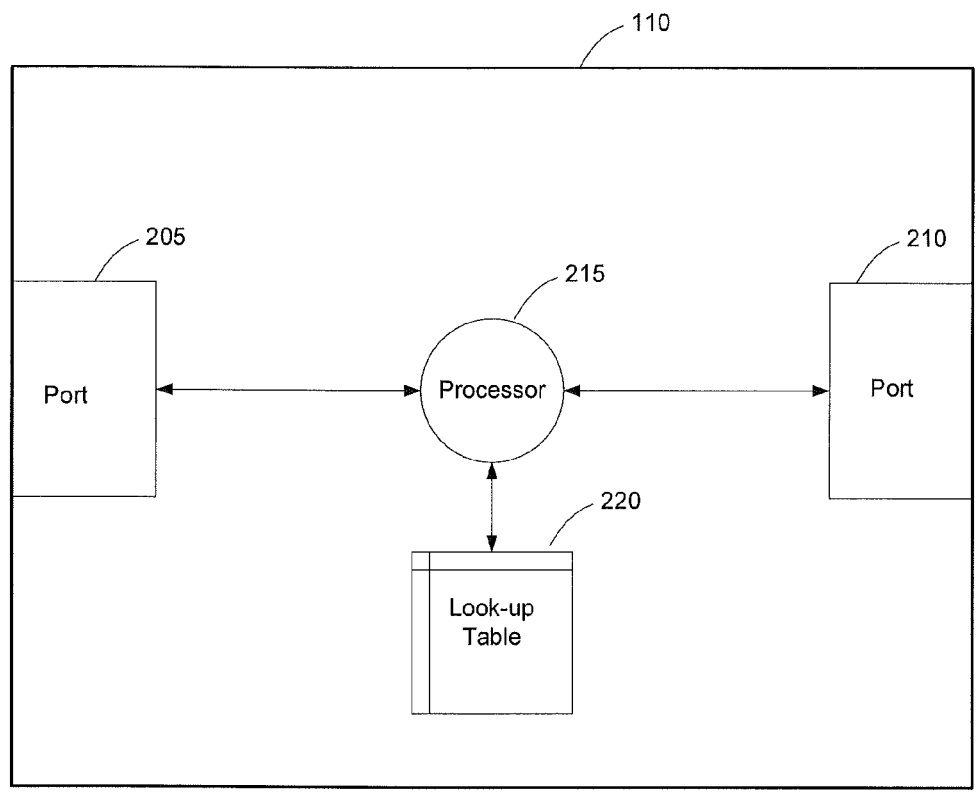
FIG. 2 illustrates a Session Dispatcher according to example embodiments.

FIG. 2 illustrates a session dispatcher 110 according to example embodiments. As shown in FIG. 2 a session dispatcher 110 includes one or more ports 205, 210, a processor 215 and a look-up table 220. The one or more ports 205, 210 may be configured to communicate with one or more clients 105, one or more cloud networks 115, one or more virtual machines 130, 135, 140, 145 and/or one or more physical machines 120, 125. The processor 215 may be configured to perform the steps described below in more detail with regard to FIG. 4. The look-up table 220 is communicatively coupled with the processor 215 and is configured to store data associated with physical and session addresses.

The session dispatcher 110 communicates with the host module or Hypervisor on a physical machine 120, 125 and may track the current CPU load on each virtual machine 130, 135, 140, 145 running on each physical machine 120, 125. The session dispatcher 110 may also communicate with each virtual machine 130, 135, 140, 145 to track session information, for example, the session dispatcher may track which sessions are linked together in a conference call.

If the session dispatcher 110 detects that a virtual machine 130, 135, 140, 145 is in an overload condition or about to be in an overload condition, the processor 215 may send a message to the host module or Hypervisor of the corresponding physical machine (e.g., physical machine 120) associated with the cloud computing environment, the message may include an indicator to buffer the virtual machine 130, 135, 140, 145 running on the physical machine 120, 125. The processor 215 may then buffer the one or more sessions associated with the virtual machine 130, 135, 140, 145.

For example, in order to detect an overload condition, the session dispatcher 110 may monitor a number of sessions and a frequency of sessions to determine a load associated with a virtual machine 130, 135, 140, 145. If the load is greater than a threshold load, the session dispatcher 110 may determine the virtual machine 130, 135, 140, 145 is in an overload condition. Alternatively, the session dispatcher 110 may receive a message from a virtual machine 130, 135, 140, 145 that is in an overload condition or is close to an overload condition.

The processor 215 may send a message to the host module or Hypervisor of one physical machine (e.g. physical machine 125), asking the host module or Hypervisor of the one physical machine to clone the virtual machine 130, 135, 140, 145 on a different physical machine 120, 125. As one skilled in the art knows, cloning a virtual machine 130, 135, 140, 145 is a straightforward operation and will not be described further for the sake of brevity. Preferably, the cloned virtual machine 130, 135, 140, 145 is a complete clone of the original virtual machine 130, 135, 140, 145, including any associated IP addresses.

The processor 215 may receive another message from the second physical machine 125. The message may include an indicator indicating the second virtual machine (e.g., virtual machine 130, 135, 140, 145) is a clone of the original virtual machine 130, 135, 140, 145. The processor 215 may then assign the same session address to both the cloned virtual machine 130, 135, 140, 145 and the original virtual machine 130, 135, 140, 145. The processor 215 may start and forward the one or more sessions to one of the original and the cloned virtual machines.

The sessions may be evenly split between the two virtual machines such that each shares the load evenly. In addition, related sessions, for example, sessions that are linked together in a conference call, may be delivered to the same virtual machine.

The session dispatcher 110 includes a look-up table 220 associating each session with an associated virtual machine's 130, 135, 140, 145 unique physical address, and uses the look-up table 220 to encapsulate incoming session packets (e.g., using network address translation or tunneling) and send the session to the physical machine. The physical machine (e.g., one of machines 120, 125), maintains a table (not shown) associating each physical address to the appropriate virtual machine 130, 135, 140, 145. Incoming packets to that physical address are then de-encapsulated (e.g., using network address translation or tunneling) and delivered to the correct virtual machine 130, 135, 140, 145 running on top of the physical machine 120, 125.

The session address may be the session address used by the network device or the client 105 to access one or more services, and the session address may have entries in the look-up table 220 associated with physical addresses associated with virtual machines 130, 135, 140, 145. The processor 215 may retrieve a forwarding address from one or more sessions, look up the forwarding address in the look-up table 220, determine the physical address based on the forwarding address, and forward traffic associated with one or more sessions to the virtual machines 130, 135, 140, 145 based on the determined physical address.

The lookup table 220 may be configured to associate a session address used by a physical machine 120, 125 to access the one or more services to physical addresses associated with physical machines 120, 125 hosting one or more virtual machines 130, 135, 140, 145 associated with the cloud computing environment 115. The session address may be the session address used by a physical machine 120, 125 to access the one or more services, and the session address may have entries in the lookup table associated with physical addresses associated with the first and the second virtual machine 130, 135, 140, 145.

Figure 3A:
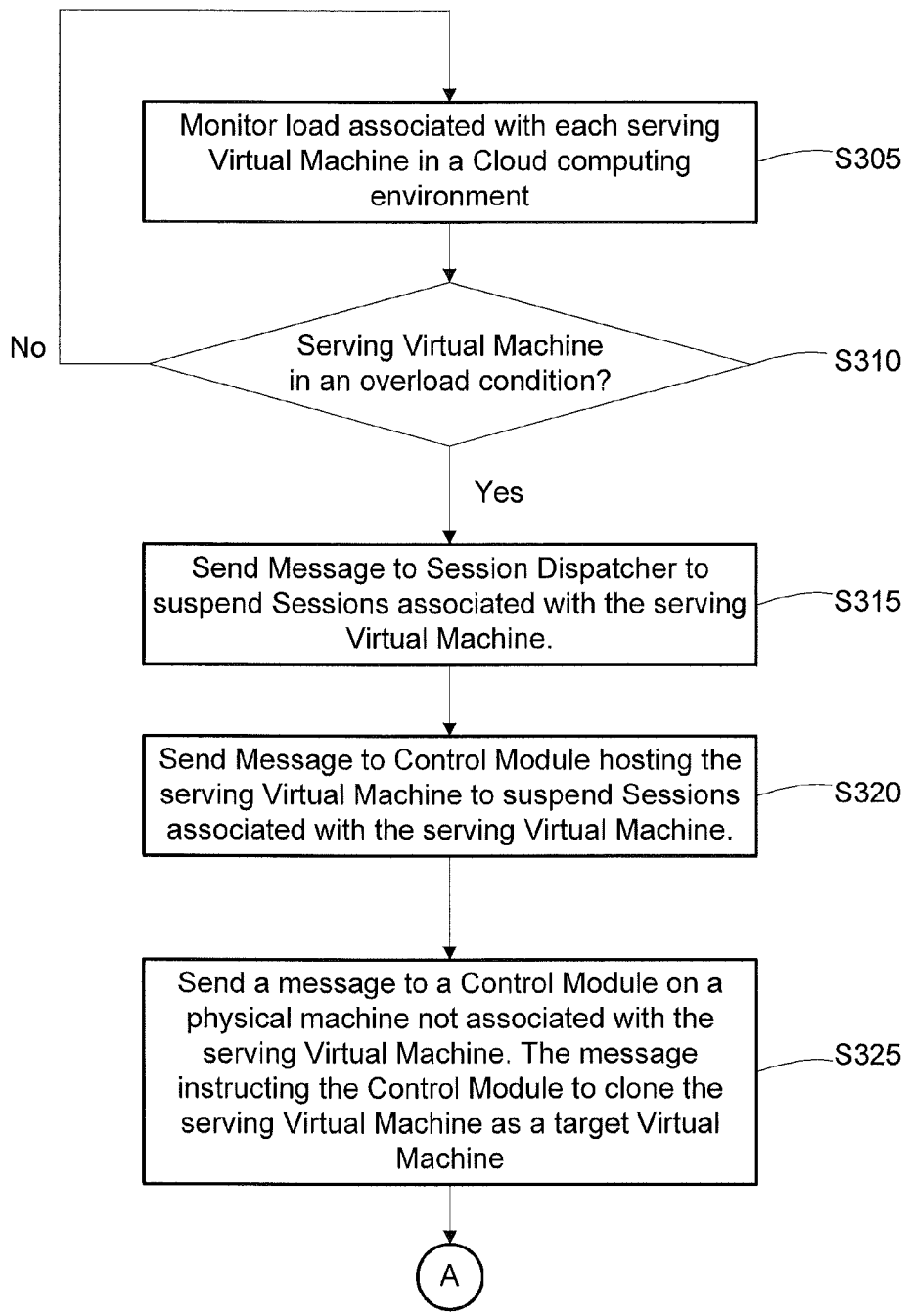
FIGS. 3A and 3B illustrate a method for overload mitigation of a virtual machine with reference to a cloud management system according to example embodiments.
Figure 3B:
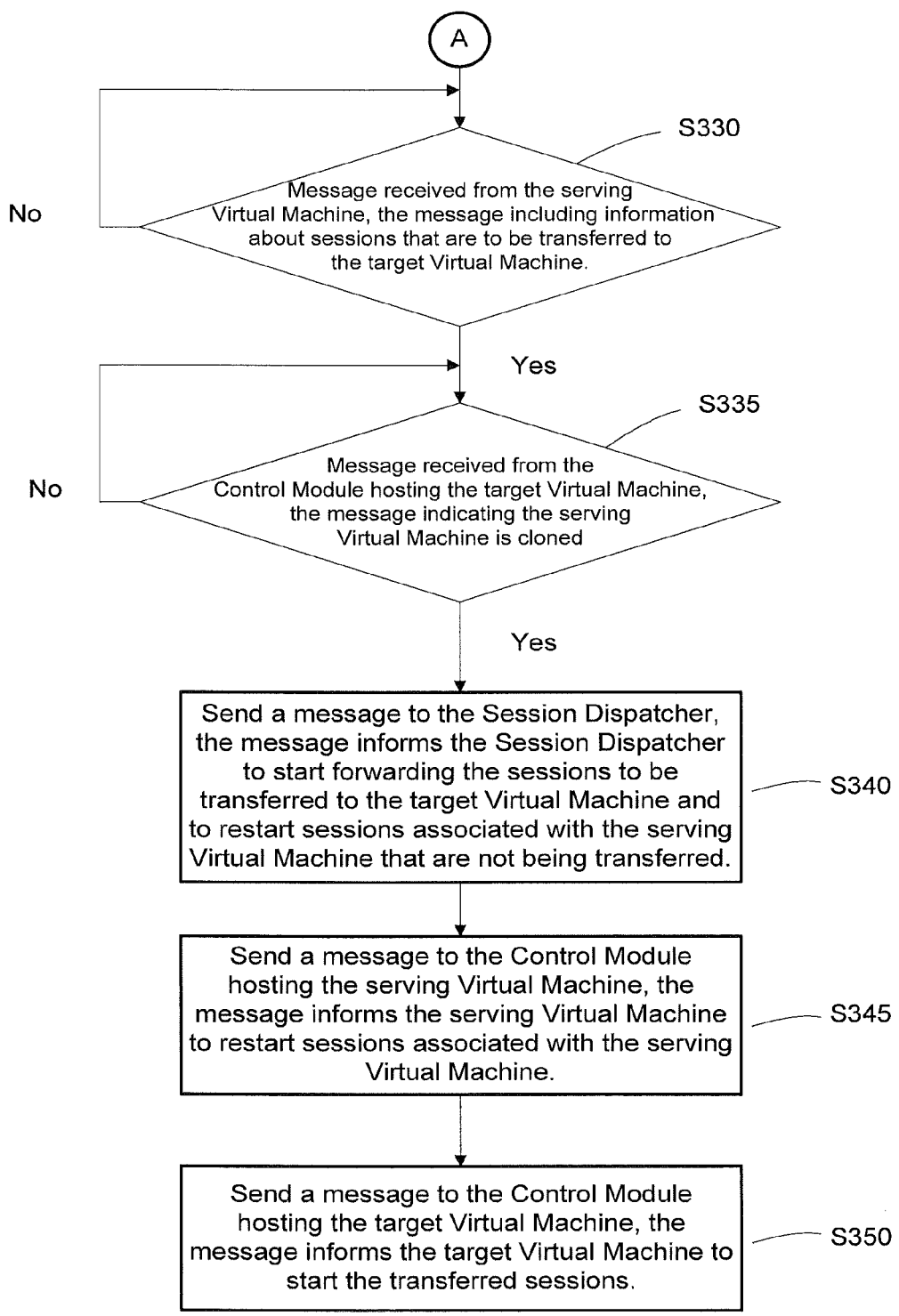

FIGS. 3A-3B, FIGS. 4A-4B and FIGS. 5A-5E illustrate a method for overload mitigation of a virtual machine according to example embodiments. While describing the steps of the method associated with FIGS. 3A-3B, FIGS. 4A-4B and FIGS. 5A-5E, reference will be made to the network of FIG. 1 and the session dispatcher 110 of FIG. 2. FIG. 3A and FIG. 3B illustrate the method for overload mitigation as performed by a cloud management system 160.

Referring to FIG. 3A, in step S305 the cloud management system 160 monitors load associated with each virtual machine in the cloud computing environment 115. Henceforth when referring to a virtual machine in the cloud network environments 115 that is currently providing services (as described above), the virtual machine may be called a serving virtual machine. Therefore, for example, in step S305 the cloud management system 160 monitors load associated serving virtual machines. Monitoring load associated with a virtual machine is known to those skilled in the art. Therefore, for the sake of brevity monitoring load associated with a virtual machine will not be discussed further.

In step S310 the cloud management system 160 determines if a serving virtual machine is in an overload condition or, alternatively about to enter an overload condition. If, in step S310, no serving virtual machines are in an overload condition, processing returns to step S310. Otherwise, if in step S310, a serving virtual machine is in an overload condition, processing continues to step S315. Determining if a virtual machine is in or will enter an overload condition is known to those skilled in the art. For example, therefore, for the sake of brevity determining if a virtual machine is in an overload condition will not be discussed further.

In step S315 the cloud management system 160 sends a message to the session dispatcher 110. The message may include information associated with a serving virtual machine and may include an instruction or indication that the session dispatcher 110 is to suspend sessions associated with the serving virtual machine. The message may be transmitted via any known protocol.

For example, assume virtual machine 130 is overloaded. In this case, the message may include information associated with virtual machine 130, for example, an address or other identification. The message may also include an indicator informing the session dispatcher 110 is to suspend all sessions associated with the address of virtual machine 130. Alternatively, the message may include a list of sessions associated with virtual machine 130 and an indicator informing the session dispatcher 110 to suspend all sessions in the list of sessions. The list of sessions may be, for example, a list of session ID's or list of session addresses.

In step S320 the cloud management system 160 sends a message to a control module hosting the serving virtual machine determined to be in an overload condition. The message may include information about the serving virtual machine and may include an instruction or indication that the control module is to suspend sessions associated with the serving virtual machine. The message may be transmitted via any known protocol.

Continuing the example began above, in step S320 the cloud management system 160 sends a message to control module 150, which may be hosting serving virtual machine 130. The message may include an address associated with virtual machine 130 and an indicator flag informing control module 150 to suspend sessions associated with the address (e.g., the address of virtual machine 130).

In step S325 the cloud management system 160 sends a message to a control module on a physical machine not associated with the serving virtual machine. The message may instruct the control module of the unassociated physical machine to clone the serving virtual machine as a target virtual machine. For example, the message may include an address associated with the serving virtual machine and an instruction indicating the virtual machine associated with the address is to be cloned. The message may be transmitted via any known protocol.

As will be described below in more detail with regards to FIGS. 5A-5E, the target virtual machine may be assigned a same address as the address associated with the serving virtual machine.

Continuing the example above, in step S325 the cloud management system 160 sends a message to control module 155. The message may include an address associated with serving virtual machine 130 and an instruction indicating the serving virtual machine 130 is to be cloned.

Referring now to FIG. 3B, in step S330 the cloud management system 160 receives a message from the control module hosting the serving virtual machine. The message may include information about the serving virtual machine and information about sessions that are to be transferred to the target virtual machine. The message may be transmitted via any known protocol.

Continuing the example above, in step S330 the cloud management system 160 receives a message from control module 150 (which hosts serving virtual machine 130). The message may include an address associated with serving virtual machine 130 and a list of sessions, for example, a list of session ID's or list of session addresses, to be transferred to a target virtual machine (e.g., virtual machine 135). In step S335 the cloud management system 160 receives a message from the control module hosting the target virtual machine. The message may indicate the target virtual machine is a clone of the serving virtual machine. For example, the message may include an address associated with the target virtual machine and a field with a flag set to indicate the virtual machine associated with the address is a clone of another virtual machine.

Continuing the example above, in step S330 the cloud management system 160 receives a message from control module 155 which hosts target virtual machine 135. The message may include an address associated with target virtual machine 135 and a field with a flag set to '1' indicating target virtual machine 135 is a clone of another virtual machine (e.g., serving virtual machine 130).

In order to maintain a relationship between serving virtual machines and target virtual machines (which as described below become serving virtual machines) the cloud management system 160 may maintain a look-up table or database associating addresses associated with control modules and serving virtual machines and target virtual machines. And, as described in more detail below, serving virtual machines and target virtual machines may have a same address.

In step S340 the cloud management system 160 sends a message to the session dispatcher 110. The message may inform the session dispatcher 110 to start forwarding the sessions to be transferred to the target virtual machine and to restart sessions associated with the serving virtual machine that are not being transferred. The message may include information about the serving virtual machine, the target virtual machine, the sessions to be transferred and may include an instruction or indication that the session dispatcher 110 is to restart sessions associated with the serving virtual machine. The message may be transmitted via any known protocol.

Continuing the example above, in step S340 the cloud management system 160 sends a message to the session dispatcher 110. The message may include an address associated with serving virtual machine 130, an address associated with target virtual machine 135, an address associated with control module 150, an address associated with control module 155, a list of sessions, for example, a list of session ID's or list of session addresses, to be transferred to target virtual machine 135, and a field with a flag set to '1' indicating the session dispatcher should restart sessions. Note, the address associated with serving virtual machine 130 and the address associated with target virtual machine 135 may be the same address.

In step S345 the cloud management system 160 sends a message to the control module hosting the serving virtual machine, the message may inform the serving virtual machine to restart sessions associated with the serving virtual machine. For example, the message may include an address associated with the serving virtual machine and a field with a flag set to indicate the serving virtual machine is to restart sessions. The message may be transmitted via any known protocol.

In step S350 the cloud management system 160 sends a message to the control module hosting the target virtual machine, the message informs the target virtual machine to start the transferred sessions. For example, the message may include an address associated with the target virtual machine and a field with a flag set to indicate the serving virtual machine is to restart sessions. The message may be transmitted via any known protocol.

Continuing the example above, in step S345 the cloud management system 160 sends a message to control module 150 the message may include an address associated with serving virtual machine 130 and a field with a flag set to '1' indicating control module 150 should restart sessions associated with serving virtual machine 130. In step S350 the cloud management system 160 sends a message to control module 155 the message may include an address associated with target virtual machine 135 and a field with a flag set to '1' indicating control module 155 should restart sessions associated with target virtual machine 135. Steps 340, 345 and 350 may be performed in parallel.

Figure 4A:
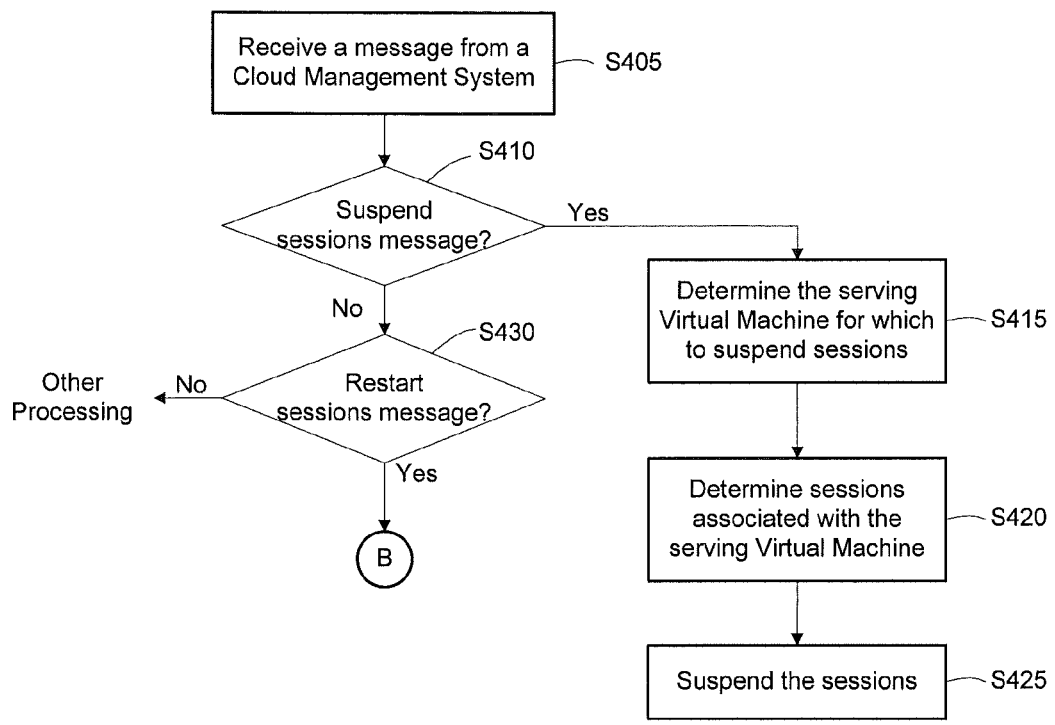
FIGS. 4A and 4B further illustrate a method for overload mitigation of a virtual machine with reference to the Session Dispatcher of FIG. 2 according to example embodiments.
Figure 4B:
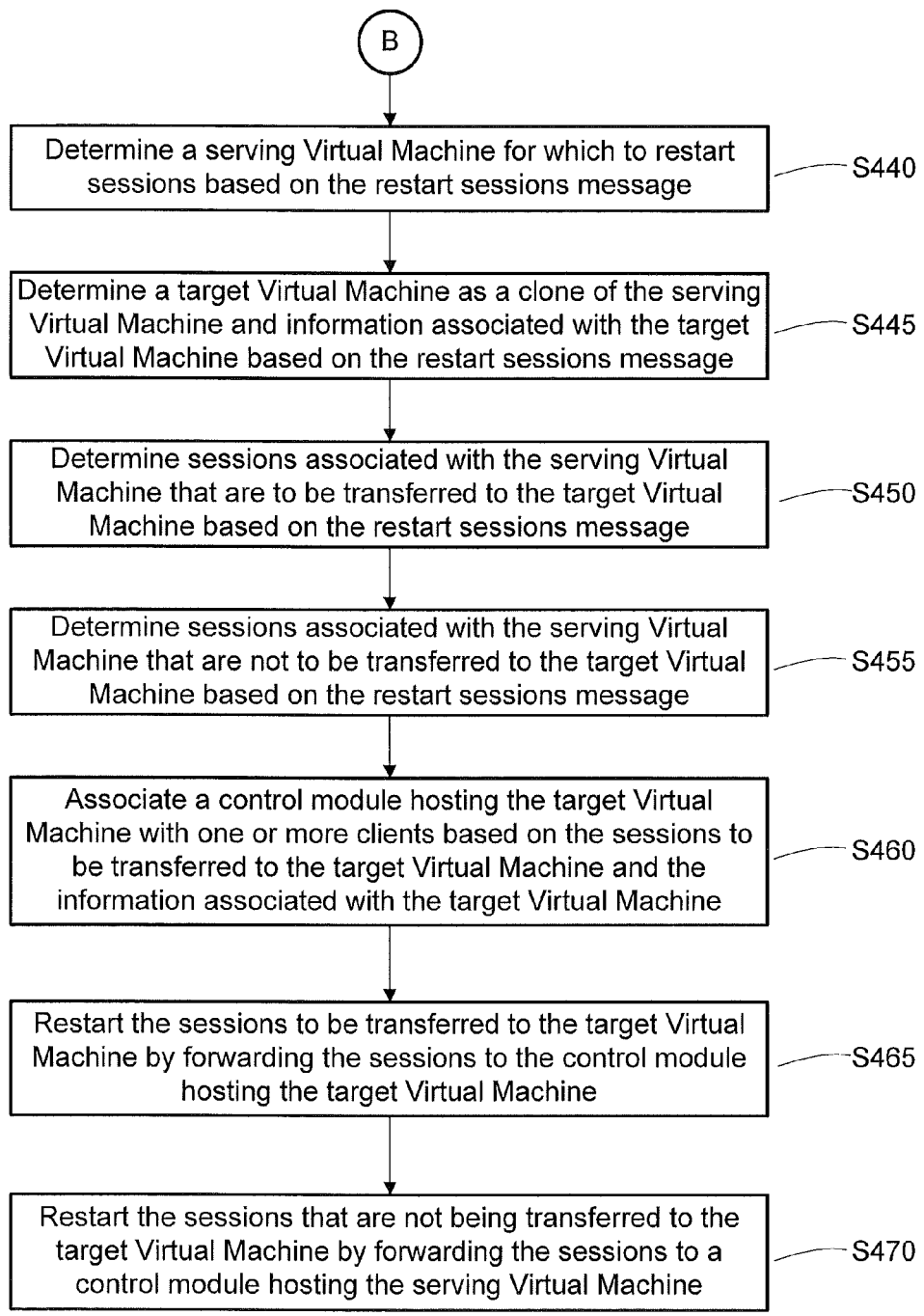

FIG. 4A and FIG. 4B illustrate the method for overload mitigation as performed by the session dispatcher 110. Referring to FIG. 4A, in step S405 the session dispatcher 110 receives a message from the cloud management system 160. The message may include information associated with a serving virtual machine, information associated with a target virtual machine, a list of sessions to be transferred to the target virtual machine and an instruction type. The message may be transmitted via any known protocol.

In step S410 the session dispatcher 110 determines if the message is a suspend sessions message. For example, the message may include a field with a flag set to '1' indicating a suspend sessions message. If the message is a suspend sessions message, processing moves to step S415.

In step S415 the session dispatcher 110 determines the serving virtual machine for which to suspend sessions. For example, the information associated with a serving virtual machine may include an address associated with a control module hosting the serving virtual machine and an address associated with the serving virtual machine.

In step S420 the session dispatcher 110 determines sessions associated with the serving virtual machine. For example, the information associated with a serving virtual machine may include a list of sessions, for example, a list of session ID's or a list of session addresses, to be suspended. Alternatively, the session dispatcher 110 may maintain an association between an address associated with a control module hosting the serving virtual machine, an address associated with the serving virtual machine and a list of sessions. This association may be stored in, for example, look-up table 220.

In step S425 the session dispatcher 110 suspends the determined sessions. For example, the session dispatcher 110 may suspend the sessions by buffering the sessions instead of forwarding the sessions to the serving virtual machine. Sessions destined for client 105 may continue to be forwarded.

Continuing the example above, if in step S410 the session dispatcher 110 determines the message is a suspend sessions message, in step S415 the session dispatcher 110 determines serving virtual machine 130 is the serving virtual machine to suspend messages. For example, the session dispatcher reads an address from the message. The address is the address of virtual machine 130. Therefore, the session dispatcher determines virtual machine 130 is the serving virtual machine for which to suspend messages In step S420 the session dispatcher 110 determines sessions to be suspended. For example, the session dispatcher reads another address field. The address is the address of control module 150. The session dispatcher then uses the address of control module 150 and the address of virtual machine 130 as keys to look up a list of sessions stored in look-up table 220 as the sessions to be suspended. In step S425 the session dispatcher 110 buffers the determined sessions and suspends forwarding the sessions to control module 150.

If in step S410 the message is not a suspend sessions message, processing moves to step S430. In step S430 the session dispatcher 110 determines if the message is a restart sessions message. For example, the message may include a field with a flag set to '1' indicating a restart sessions message. If the message is not a restart sessions message, processing moves to some other step which is outside the scope of this disclosure. Otherwise, the message is a restart sessions message and processing moves to step S440.

Referring to FIG. 4B, in step S440 the session dispatcher 110 determines a serving virtual machine for which to restart sessions based on the restart sessions message. For example, the information associated with a serving virtual machine may include an address associated with a control module hosting the serving virtual machine and an address associated with the serving virtual machine. The combination of addresses may inform the session dispatcher for which serving virtual machine to restart sessions.

In step S445 the session dispatcher 110 determines a target virtual machine as a clone of the serving virtual machine and information associated with the target virtual machine based on the restart sessions message. For example, the information associated with the target virtual machine may include an address associated with the target virtual machine, an address associated with the control module hosting the target machine and an indicator indicating the target virtual machine is a clone of the serving virtual machine.

In step S450 the session dispatcher 110 determines sessions associated with the serving virtual machine that are to be transferred to the target virtual machine based on the restart sessions message. For example, the list of sessions to be transferred to the target virtual machine, received in the restart sessions message, may include a list of session ID's, a list of session addresses or one or more clients associated with sessions that are to be transferred to the target virtual machine.

In step S455 the session dispatcher 110 determines sessions associated with the serving virtual machine that are not to be transferred to the target virtual machine based on the restart sessions message. For example, as described above, the list of sessions to be transferred to the target virtual machine, received in the restart sessions message, may include a list of session ID's, a list of session addresses or one or more clients associated with sessions that are to be transferred to the target virtual machine. The session dispatcher may store (e.g., in look-up table 220) a list of all sessions associated with a serving virtual machine. Sessions associated with the virtual machine that are not in the list of sessions to be transferred may be determined as the list of sessions not to be transferred to the target virtual machine.

Continuing the example above, in step S440 the session dispatcher 110 determines that the serving virtual machine is virtual machine 130 based on, for example, an address associated with the restart session message. In step S445 the session dispatcher 110 determines that the target virtual machine is virtual machine 135 based on, for example, an address associated with the restart session message. In step S450 the session dispatcher 110 determines the sessions to be transferred to target virtual machine 135 based on the list of sessions received in the restart sessions message. In step S455 the session dispatcher 110 determines the sessions to remain on serving virtual machine 130 as the sessions that are not transferred to the target virtual machine 135.

In step S460 the session dispatcher 110 associates the control module hosting the target virtual machine with one or more clients based on the sessions to be transferred to the target virtual machine and the information associated with the target virtual machine. For example, the information associated with the target virtual machine may include an address associated with the control module hosting the virtual machine. The session dispatcher 110 may determine an address (e.g., an IP address and a port number) for clients associated with the sessions being moved to the target machine (e.g., the sessions determined in step S450). The session dispatcher 110 may then store (e.g., in look-up table 220) an association between the address of the control module hosting the target virtual machine and the address of clients associated with the sessions being moved.

Continuing the example above, if client 105 has sessions associated with ports 1-5 (not shown), and in step S450 the sessions associated ports 1-3 are the sessions determined to be moved to target virtual machine 135, in step S460 the session dispatcher 110 stores an association in look-up table 220 between the IP address for client 105 and each of ports 1-3 and control module 155.

In step S465 the session dispatcher 110 restarts the sessions being transferred to the target virtual machine by forwarding the sessions to the control module hosting the target virtual machine. In step S470 the session dispatcher 110 may restart the sessions that are not being transferred to the target virtual machine by forwarding the sessions to the control module hosting the serving virtual machine.

For example, as one skilled in the art knows, a session is an interconnection between two or more computing devices for providing services. As described above, the services may be voice or data services. Data associated with the services may be communicated between the computing devices in packets. The packets may have one or more headers and one or more data payloads.

For example, forwarding a session may include using a well known IP tunneling protocol. Therefore, forwarding may include encapsulating the packets in a second packet having a destination address of the control module hosting the virtual machine (e.g., the serving or the target virtual machine) and sending the second packet to the address. The control module then de-encapsulates the second packet and sends the original packet to the destination address of the original packet (e.g., the serving or the target virtual machine).

Continuing the example above, the session dispatcher 110 restarts the sessions by forwarding sessions to control module 150 and 155. To do this, the session dispatcher 110 encapsulates packets associated with the sessions received from client 105 and ports 1-3, using a well known IP tunneling protocol, into packets having an address associated with control module 155. The session dispatcher 110 also encapsulates packets associated with the sessions received from client 105 and ports 4-5, using a well known IP tunneling protocol, into packets having an address associated with control module 150. Control modules 150 and 155 then de-encapsulate these packets and forwards the original packets to serving virtual machine 130 and target virtual machine 135 using the address associated with serving virtual machine 130 and target virtual machine 135 which is the same address.

Figure 5A:
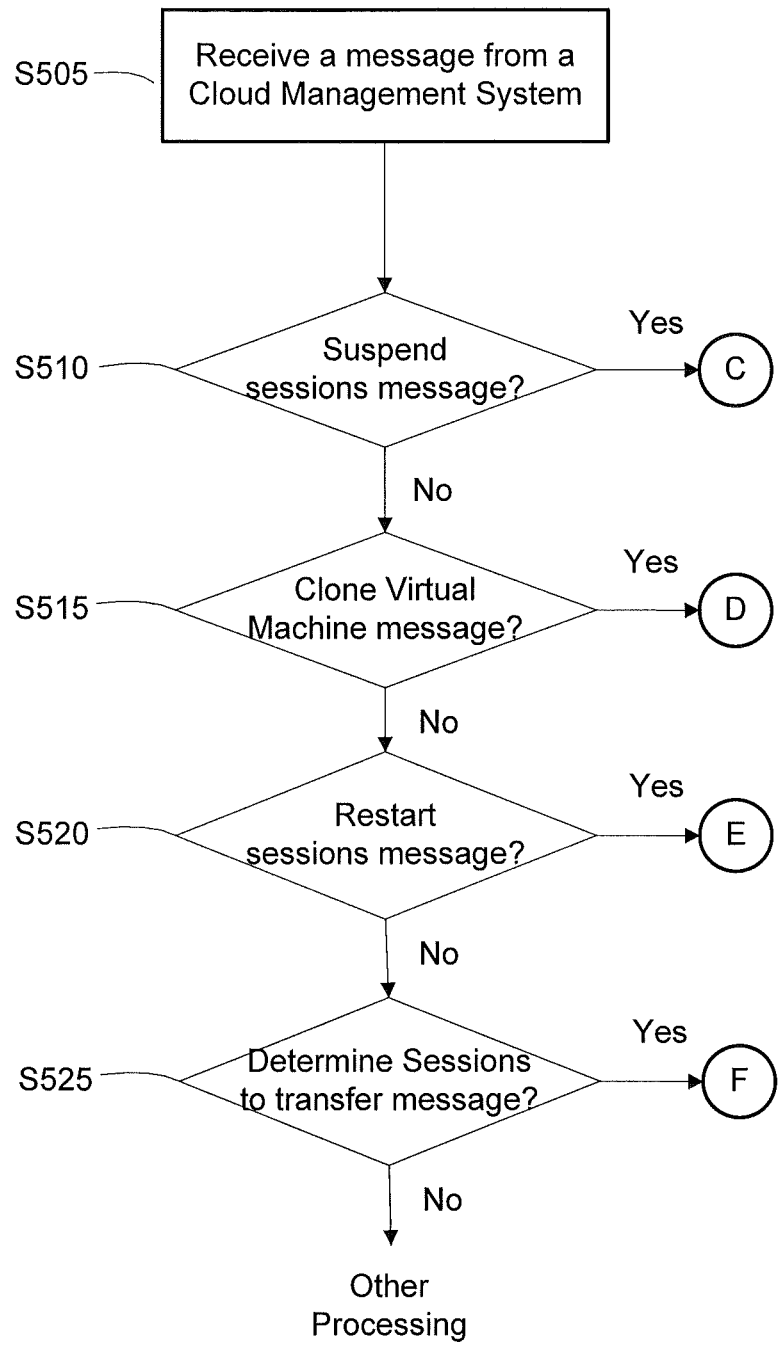
FIGS. 5A-5E further illustrate a method for overload mitigation of a virtual machine with reference to a control module configured to host one or more virtual machines according to example embodiments.

FIGS. 5A-5E illustrate the method for overload mitigation as performed by a control module configured to host a virtual machine. Referring to FIG. 5A, in step S505 the control module receives a message from a cloud management system 160. The message may include an indication to suspend sessions, an indication to clone a virtual machine, an indication to restart sessions, information about a serving and/or a target virtual machine and information about sessions being transferred.

In step S510 the control module determines if the message is a suspend sessions message. For example, the message may include a field with a flag set to '1' indicating a suspend sessions message. If the message is a suspend sessions message, processing moves to step S530.

Figure 5B:
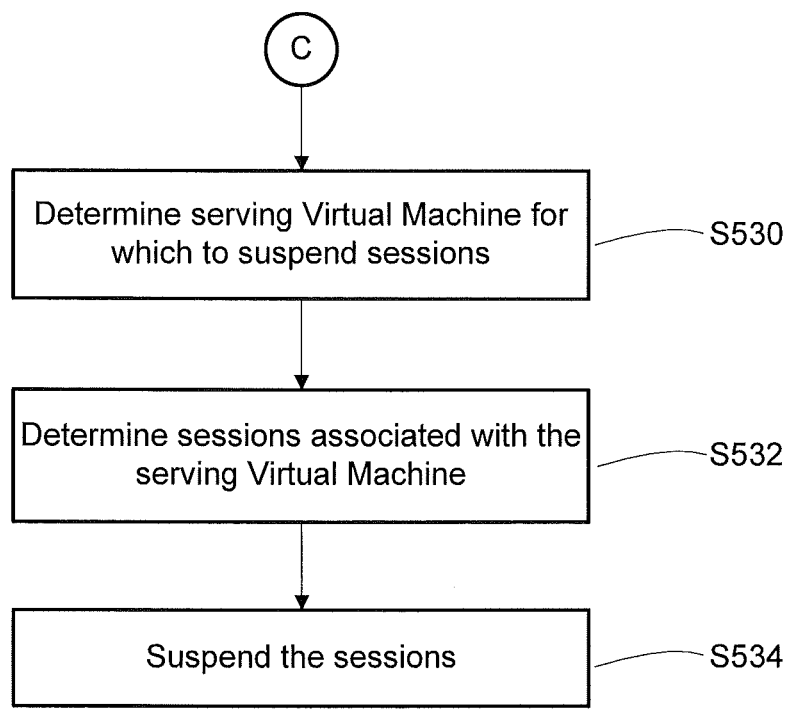

Referring to FIG. 5B, in step S530 the control module determines the serving virtual machine for which to suspend sessions. For example, the information associated with a serving virtual machine may include an address associated with a serving virtual machine for which sessions are to be suspended.

In step S532 the control module determines sessions associated with the serving virtual machine. For example, the information associated with a serving virtual machine may include a list of sessions, for example, a list of session ID's or list of session addresses, to be suspended. Alternatively, the control module may maintain an address associated with the serving virtual machine and a list of sessions associated with that address. This association may be stored in a memory associated with the control module (not shown).

In step S534 the control module suspends the determined sessions. For example, the control module may suspend the sessions by buffering the sessions instead of forwarding the sessions to the serving virtual machine. Sessions destined for the session dispatcher 110 may continue to be forwarded.

Continuing the example above, in step S505 control module 150 receives the message. In step S510 control module reads the message and determines the message is a suspend sessions message. Processing moves to step S530 where control module 150 determines the address associated with the suspend sessions message is associated with serving virtual machine 130. In step S532 control module 150 determines the sessions associated with serving virtual machine 130 and suspends those sessions in step S534 by buffering the sessions rather than forwarding the sessions to serving virtual machine 130.

Returning to FIG. 5A, in step S515 the control module determines if the message is a clone virtual machine message. For example, the message may include a field with a flag set to '1' indicating a clone virtual machine message. If the message is a clone virtual machine message, processing moves to step S540.

Figure 5C:
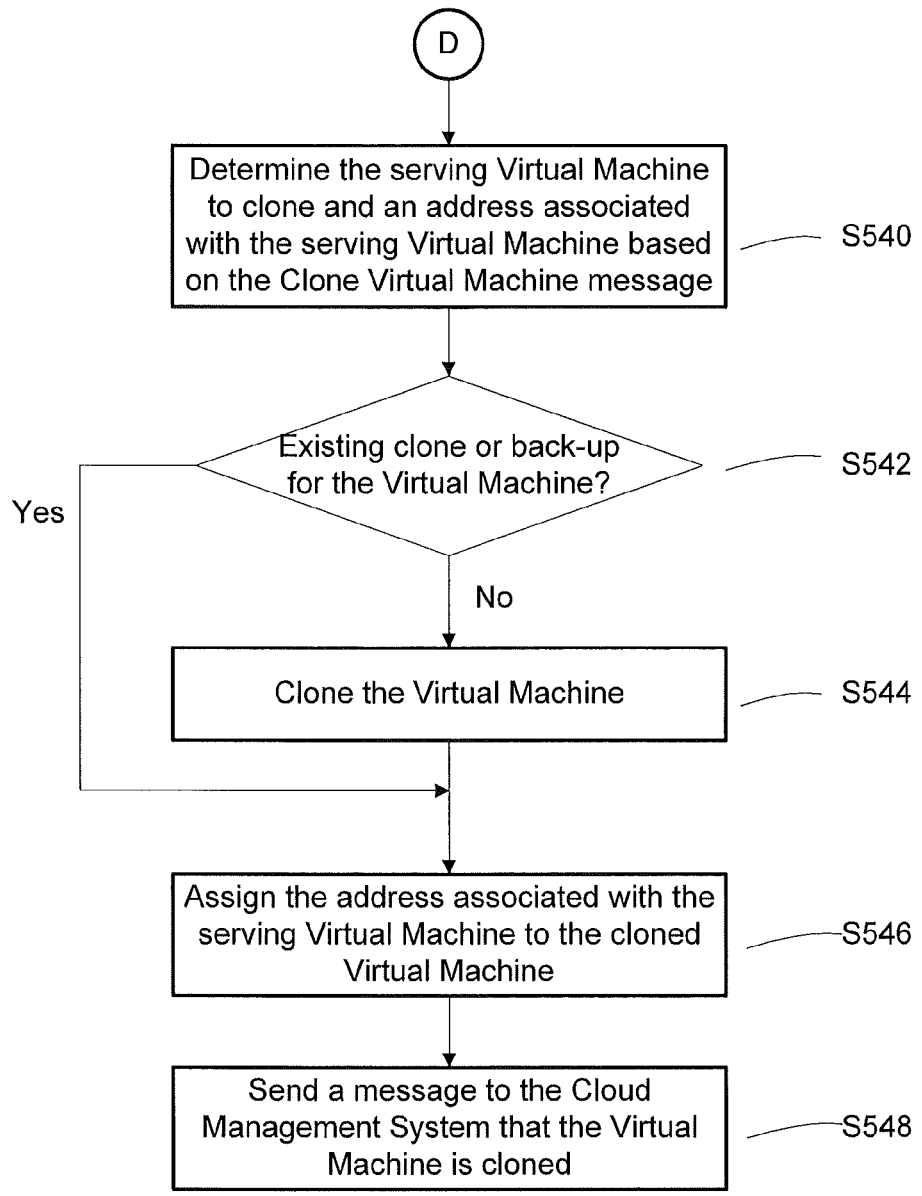

Referring to FIG. 5C, in step S540 the control module determines the serving virtual machine to clone and an address associated with the serving virtual machine based on the clone virtual machine message. For example, the clone virtual machine message may include the address of a serving virtual machine and an address of a control module hosting the serving virtual machine. The addresses may be included in the information associated with the serving virtual machine. The control module may make the determinations based on these addresses.

In step S542 the control module determines if the control module is hosting a virtual machine that is a clone of the serving virtual machine. For example, a physical machine may have an associated dedicated physical back-up that includes the serving virtual machine. Also, the serving virtual machine may have a back-up on a separate physical machine. The physical machine back-up or the virtual machine back-up may be used as a clone for the serving virtual machine. The use of back-ups may be a matter of design choice.

If the control module is hosting a clone of the serving virtual machine, processing moves to step S546. Otherwise, in step S544 the control module creates a clone of the serving virtual machine. Creating a clone of a virtual machine is well known to those skilled in the art. Therefore, for the sake of brevity cloning a virtual machine will not be discussed further.

In step S546 the control module assigns the address associated with the serving virtual machine to the cloned virtual machine. For example, the address determined in step S540 is assigned to the cloned virtual machine from step S544. The assignment may be an association between a virtual machine and an address stored in a memory associated with the control module (not shown).

In step S548 the control module sends a message to the cloud management system 160. The message may include in indication that the serving virtual machine has been cloned and information related to the cloned virtual machine. The message may be transmitted via any known protocol.

Continuing the example above, control module 155 receives the message in step S505. In step S515 control module 155 determines the message is a clone virtual machine message. In step S540 control module 155 determines from the clone virtual machine message that virtual machine 130 is the serving virtual machine to be cloned and determines an address associated with serving virtual machine 130. In step S544 control module 155 uses a well known method to clone serving virtual machine 130 as target virtual machine 135 and in step S546 assigns target virtual machine 135 the same address as associated with serving virtual machine 130. In step S548 control module 155 sends a message to cloud management system 160. The message includes in indication that the serving virtual machine 130 has been cloned as target machine 135 and information related to the target virtual machine 135.

Returning to FIG. 5A, in step S520 the control module determines if the message is a restart sessions message. For example, the message may include a field with a flag set to '1' indicating a restart sessions message. If the message is a restart sessions message, processing moves to step S550.

Figure 5D:
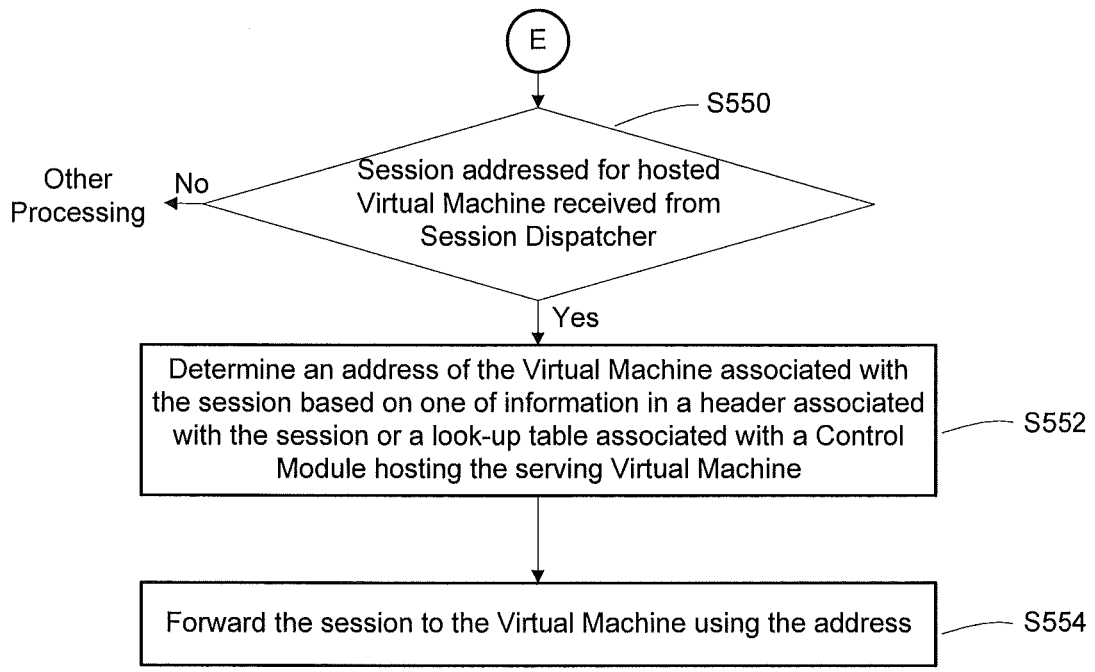

Referring to FIG. 5D, in step S550 the control module determines if the session was received from the session dispatcher 110. If in step S550 the session is not received from the session dispatcher 110, processing moves to some other processing that is outside the scope of this disclosure. If in step S550 the session is received from the session dispatcher 110, processing moves to step S552. This determination is well known in the art and will not be described further.

In step S552 the control module determines an address of the virtual machine associated with the session based on one of information in a header of a packet associated with the session or a look-up table associated with the control module hosting the serving virtual machine. For example, as described above, the sessions may have associated packets that are received via a well known IP tunneling protocol. The destination address of the packet may be the control module as set in a header of the packet. The control module may then de-encapsulate the packet to expose an original packet having a destination address of the virtual machine. In step S554 the control module then forwards the packet to the serving virtual machine using that address.

Continuing the example above, in step S520 the control module receives a restart sessions message. Sessions are restarted such that if in step S550 it is determined a session is received from session dispatcher 110 and the control module is control module 150, in step S552 control module 150 de-encapsulates the packet and determines the address to be associated with serving virtual machine 130 and in step S554 forwards the session to serving virtual machine 130 using the address. For example, as described above the sessions will be from the address of client 105 ports 4 and 5 and having a destination address of serving virtual machine 130 and the packet has a destination address of control module 150 as determined by session dispatcher 110 as described above.

Further, if in step S550 the session is received from session dispatcher 110 and the control module is control module 155, in step S552 control module 155 de-encapsulates the packet and determines the address to be associated with serving virtual machine 130. However, as described above, target virtual machine 135 has the same address as serving virtual machine 130. Therefore, in step S554 control module 155 forwards the session to target virtual machine 135 using the address.

Returning to FIG. 5A, in step S525 the control module determines if the message is a determine sessions to transfer message. For example, the message may include a field with a flag set to '1' indicating a determine sessions to transfer message. If the message is not a determine sessions to transfer message, processing moves to some other step which is outside the scope of this disclosure. Otherwise, the message is a determine sessions to transfer message, an processing moves to step S560.

Figure 5E:
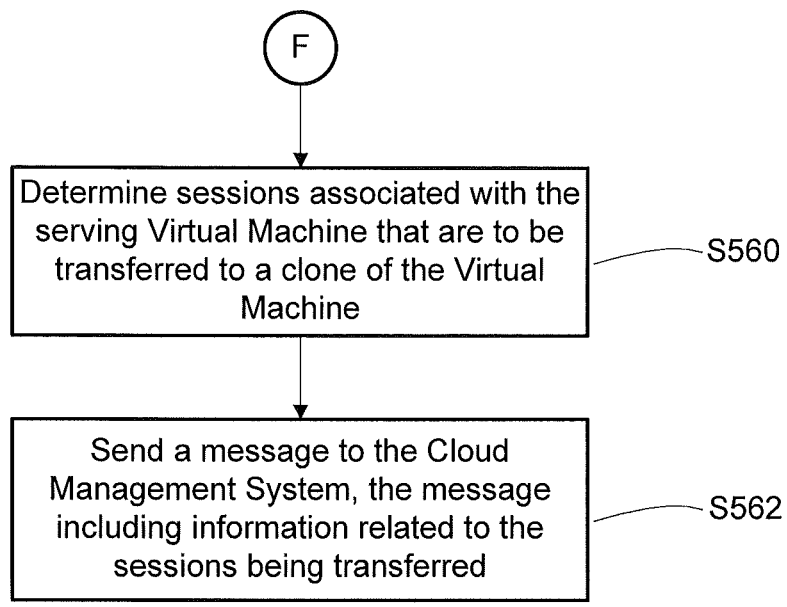

Referring to FIG. 5E, in step S560 the control module determines sessions associated with the serving virtual machine that are to be transferred to a clone of the virtual machine. For example, if every session being serviced by the serving virtual machine is independent of every other session, then sessions may be independently selected based on, for example, load characteristics for the purpose of being transferred. For example, in a case where all of the sessions are independent, a target load after transferring sessions may be 50% of the pre-transfer load. Therefore, sessions may be chosen based on their load characteristics until a list is generated such that the load to be transferred is approximately equal to 50% of the current load serviced by the virtual machine.

However, for certain services, for example conferencing services, two or more client sessions may be tied together through service logic. These interdependent sessions may be kept together, either at the serving virtual machine or at the target virtual machine. For example, in a case where some of the sessions are independent and some of the sessions are interdependent, only the independent or interdependent sessions may be transferred. Alternatively, if load characteristics of the sessions are such that the independent session load is greater than 50%, independent sessions may be selected as described above.

To perform the determining step of step S560, the control module may include a worker process that determines the type of each session (e.g., independent or interdependent) and a load characteristic of each session. Alternatively, the worker process may be run on the serving virtual machine and be configured to report results to the control module. A worker process may be, for example, a process that monitors each of the aforementioned characteristics of a session and stores some information associated with the session. The monitored characteristics may be a matter of design choice.

In step S562 the control module sends a message to the cloud management system 160. The message may include information related to the sessions to be transferred as determined in step S560. The message may be transmitted via any known protocol.

Continuing the example above, control module 150 may determine sessions associated with an address of client 105 and port 4-5 are interdependent and that sessions associated with an address of client 105 and port 1-3 are independent. Therefore, in step S536 control module 150 may select the sessions associated with an address of client 105 and port 1-3 to be moved. In step S538 control module 150 sends a message including a listing of sessions based the address of client 105 and port 1-3 to the cloud management system 160.

At the completion of this process, serving virtual machine 130 and target virtual machine 135 are both serving virtual machines. Client 105 is unable to recognize a difference between virtual machine 130 and 135 because client 105 uses the same address for both.

Although in describing the example embodiments of FIG. 3A, FIG. 3B, FIG. 4A, FIG. 4B and FIGS. 5A-5E, reference has been made to virtual machines 130 and 135, those skilled in the art will understand any virtual machine 130, 135, 140 and 145 may be substituted for virtual machine 130 and/or virtual machine 135.

Alternative embodiments of the invention may be implemented as a computer program product for use with a computer system, the computer program product being, for example, a series of computer instructions, code segments or program segments stored on a tangible or non-transitory data recording medium (computer readable medium), such as a diskette, CD-ROM, ROM, or fixed disk, or embodied in a computer data signal, the signal being transmitted over a tangible medium or a wireless medium, for example, microwave or infrared. The series of computer instructions, code segments or program segments can constitute all or part of the functionality of the methods of example embodiments described above, and may also be stored in any memory device, volatile or non-volatile, such as semiconductor, magnetic, optical or other memory device.

Example embodiments provide an improved solution for overload control/mitigation of a virtual machine because in known methods all sessions are transferred from a virtual machine. Therefore, after the load is transferred the original virtual machine is stopped after the overload control/mitigation process is complete. Example embodiments enable sessions to be transferred to a target virtual machine without transferring all sessions. Therefore, load is reduced on the serving virtual machine and the resources of the cloud computing environment are more efficiently used because the original or serving virtual machine remains as a serving virtual machine and is not stopped after the overload control/mitigation process is complete.

While example embodiments have been particularly shown and described, it will be understood by one of ordinary skill in the art that variations in form and detail may be made therein without departing from the spirit and scope of the claims.

The invention being thus described, it will be obvious that the same may be varied in many ways. Such variations are not to be regarded as a departure from the invention, and all such modifications are intended to be included within the scope of the invention.

We claim:

1. A method for overload mitigation of a virtual machine in a cloud computing environment, the virtual machine being a serving virtual machine for one or more sessions, the method comprising:

based on the serving machine being in an overload condition, receiving, by a network element associated with the cloud computing environment, a first message from the serving virtual machine, the first message including a list of sessions to transfer to a target virtual machine, the target virtual machine being a clone of the serving virtual machine, each of a plurality of sessions in the list of sessions indicating at least one service to be accessed, sending, by the network element, a second message to a session dispatcher, the second message including the list of sessions, an address associated with a control module of the target machine and an indicator instructing the session dispatcher to associate one or more client addresses with the address corresponding to the control module of the target machine based on the list of sessions, sending, by the network element, a cloning message to the control module, the cloning message including the session address corresponding to the serving virtual machine and an indicator, the indicator instructing the control module to clone the serving virtual machine such that (i) the session address associated with the serving virtual machine is assigned to the target virtual machine by the control module, and (ii) the serving virtual machine does not correspond to a same physical machine as the control module, and receiving, by the network element, a cloning acknowledgment message from the control module, the cloning acknowledgment message including (i) an indicator indicating that the target virtual machine is a clone of the serving virtual machine and (ii) an address of the control module.

2. The method for overload mitigation according to claim 1, further comprising:
 based on the serving virtual machine being in an overload condition,
  sending, by the network element, a second message to a session dispatcher, the second message instructing the session dispatcher to suspend sessions associated with the serving virtual machine.

3. The method for overload mitigation according to claim 1, further comprising:
 based on the serving virtual machine being in an overload condition,
  sending, by the network element, a second message to a control module hosting the serving virtual machine, the second message instructing the control module to suspend sessions associated with the serving virtual machine.

4. The method for overload mitigation according to claim 1, further comprising:
 based on the serving virtual machine being in an overload condition,
  sending, by the network element, a second message to a control module associated with a physical machine not hosting the serving virtual machine, the second message including an address of the serving virtual machine, instructions to clone the serving virtual machine as a target virtual machine and instructions to assign the target virtual machine the address of the serving virtual machine.

5. A method for overload mitigation of a virtual machine in a cloud computing environment, the virtual machine being a serving virtual machine for one or more sessions, the method comprising:
 assigning, by a control module, a session address to a target virtual machine, the session address being an address of a serving virtual machine associated with a different control module, the target virtual machine being a clone of the serving virtual machine, the session address indicating at least one service to be accessed, the assigning including,
  receiving, by the control module, a first message from a network element associated with the cloud computing environment, the first message including the session address corresponding to the serving virtual machine and an indicator instructing the control module to clone the serving virtual machine,
  cloning, by the control module, the serving virtual machine as the target virtual machine, and
  assigning, by the control module, the session address associated with the serving virtual machine to the target virtual machine, wherein the control module does not correspond to a same physical machine as the serving virtual machine;
 sending, by the control module, a second message to the network element, the second message including (i) an indicator indicating that the target virtual machine is the clone of the serving virtual machine and (ii) an address of the control module; and
 forwarding, by the control module, at least one data packet associated with the one or more sessions to the target virtual machine if the data packet received by the control module includes the address of the serving virtual machine.

6. The method for overload mitigation according to claim 5, wherein forwarding at least one data packet includes,
 receiving the data packet from the session dispatcher, the data packet received via an IP tunneling protocol,
 de-encapsulating the data packet to discover a forwarding address and a second data packet associated with the session,
 forwarding the second data packet to the target virtual machine using the forwarding address.

7. The method for overload mitigation according to claim 6, wherein the forwarding address is an address associated with the serving virtual machine and an address associated with the target virtual machine.

8. The method for overload mitigation according to claim 5, further comprising:
 determining a list of sessions to be transferred to the target virtual machine based on at least one of a type of service, load of the serving virtual machine, load of the target virtual machine, capabilities of the target virtual machine and a relationship between two or more session.

9. The method for overload mitigation according to claim 8, further comprising:
 sending, by the control module, a message to a network element associated with the cloud computing environment, the message including the determined list of sessions.

* * * * *